US010261498B2

(12) United States Patent
Oota (10) Patent No.: US 10,261,498 B2
(45) Date of Patent: Apr. 16, 2019

(54) NUMERICAL CONTROLLER (71) Applicant: FANUC Corporation, Minamitsuru-gun, Yamanashi (JP)

(72) Inventor: Yuu Oota, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 544 days.

(21) Appl. No.: 15/040,202

(22) Filed: Feb. 10, 2016

(65) Prior Publication Data
US 2016/0246283 A1  Aug. 25, 2016

(30) Foreign Application Priority Data

Feb. 20, 2015 (JP) ................................. 2015-031314

(51) Int. Cl.
*G05B 19/402* (2006.01)
*G05B 19/4093* (2006.01)
*G05B 19/4155* (2006.01)

(52) U.S. Cl.
CPC ...... *G05B 19/4093* (2013.01); *G05B 19/4155* (2013.01); *G05B 2219/39438* (2013.01); *Y02P 90/265* (2015.11)

(58) Field of Classification Search
CPC ........ G05B 19/402; G05B 2219/34015; G05B 2219/36088; G05B 19/4093; G05B 19/4155; G05B 2219/39438; G05B 19/46; G05B 19/18; G05B 19/416; Y02P 90/265
USPC ......................................................... 700/159
See application file for complete search history.

(56) References Cited

U.S. PATENT DOCUMENTS

| 4,228,495 | A | * | 10/1980 | Bernhard | ........... G05B 19/4147 700/180 |
| 4,262,336 | A | * | 4/1981 | Pritchard | ........... G05B 19/4141 318/573 |
| 4,449,196 | A | * | 5/1984 | Pritchard | ............... G05B 19/42 708/550 |
| 5,815,399 | A |  | 9/1998 | Fujibayashi et al. | |
| 7,826,370 | B1 | * | 11/2010 | Vargantwar | ........... H04L 1/0007 370/235 |
| 2012/0283879 | A1 |  | 11/2012 | Takeuchi et al. | |
| 2014/0025192 | A1 | * | 1/2014 | Seya | .................. G05B 19/4063 700/174 |

(Continued)

FOREIGN PATENT DOCUMENTS

JP   H08-161022 A   6/1996
JP   H10-049216 A   2/1998
(Continued)

OTHER PUBLICATIONS

Decision to Grant a Patent dated Mar. 7, 2017 in Japanese Patent Application No. 2015-031314 (3 pages) with an English translation (3 pages).

*Primary Examiner* — Alexander Oscar Williams
(74) *Attorney, Agent, or Firm* — Drinker Biddle & Reath LLP (57) ABSTRACT

Provided is a numerical controller including a wait management table that stores wait management information of each machining program, a wait controller that performs wait control of each axis based on the wait management information with respect to an axis controller that controls each axis of each path, and a management unit that updates the wait management information of each machining program stored in the wait management table.

2 Claims, 7 Drawing Sheets

(56) References Cited

U.S. PATENT DOCUMENTS

2015/0073582 A1\* 3/2015 Fukumoto .......... G05B 19/4155
                                                                                                                 700/170
2016/0246283 A1\* 8/2016 Oota .................. G05B 19/4093

FOREIGN PATENT DOCUMENTS

| | | |
|---|---|---|
| JP | 2009-282625 A | 12/2009 |
| JP | 2012-234445 A | 11/2012 |

\* cited by examiner

| PROGRAM UNDER EXECUTION | O0001 | O0002 | O0003 |
|---|---|---|---|
| WAIT M-CODE | M901 NOT ISSUED | M901 NOT ISSUED | M901 NOT ISSUED |
|  | M902 NOT ISSUED | M902 NOT ISSUED |  |

FIG.4A WAIT MANAGEMENT TABLE AT START OF MACHINING PROGRAM

| PROGRAM UNDER EXECUTION | O0001 | O0002 | O0003 |
|---|---|---|---|
| WAIT M-CODE | M901 NOT ISSUED | M901 NOT ISSUED | M901 NOT ISSUED |
| | M902 NOT ISSUED | M902 NOT ISSUED | |

FIG.4B WAIT MANAGEMENT TABLE AFTER O0001 ISSUES M901

| PROGRAM UNDER EXECUTION | O0001 | O0002 | O0003 |
|---|---|---|---|
| WAIT M-CODE | UNDER WAIT BASED ON M901 | M901 NOT ISSUED | M901 NOT ISSUED |
| | M902 NOT ISSUED | M902 NOT ISSUED | |

FIG.4C WAIT MANAGEMENT TABLE AFTER O0002 AND O0003 ISSUE M901

| PROGRAM UNDER EXECUTION | O0001 | O0002 | O0003 |
|---|---|---|---|
| WAIT M-CODE | UNDER WAIT BASED ON M901 | UNDER WAIT BASED ON M901 | UNDER WAIT BASED ON M901 |
| | M902 NOT ISSUED | M902 NOT ISSUED | |

FIG.4D WAIT MANAGEMENT TABLE AFTER COMPLETION OF EXECUTION OF O0003

| PROGRAM UNDER EXECUTION | O0001 | O0002 | |
|---|---|---|---|
| WAIT M-CODE | | | |
| | M902 NOT ISSUED | M902 NOT ISSUED | |

FIG.4E WAIT MANAGEMENT TABLE AFTER O0001 AND O0002 ISSUE M902

| PROGRAM UNDER EXECUTION | O0001 | O0002 | |
|---|---|---|---|
| WAIT M-CODE | | | |
| | UNDER WAIT BASED ON M902 | UNDER WAIT BASED ON M902 | |

FIG.4F WAIT MANAGEMENT TABLE AFTER COMPLETION OF EXECUTION OF O0001 AND O0002

| PROGRAM UNDER EXECUTION | | | |
|---|---|---|---|
| WAIT M-CODE | | | |
| | | | |

FIG.5A WAIT MANAGEMENT TABLE AT START OF MACHINING PROGRAM

| PROGRAM UNDER EXECUTION | O0001 | O0002 |
|---|---|---|
| WAIT M-CODE | M901 NOT ISSUED | M901 NOT ISSUED |
| | M902 NOT ISSUED | M902 NOT ISSUED |

FIG.5B WAIT MANAGEMENT TABLE AFTER O0001 ISSUES M901

| PROGRAM UNDER EXECUTION | O0001 | O0002 |
|---|---|---|
| WAIT M-CODE | UNDER WAIT BASED ON M901 | M901 NOT ISSUED |
| | M902 NOT ISSUED | M902 NOT ISSUED |

FIG.5C WAIT MANAGEMENT TABLE AFTER O0002 ISSUES M901

| PROGRAM UNDER EXECUTION | O0001 | O0002 |
|---|---|---|
| WAIT M-CODE | UNDER WAIT BASED ON M901 | UNDER WAIT BASED ON M901 |
| | M902 NOT ISSUED | M902 NOT ISSUED |

FIG.5D WAIT MANAGEMENT TABLE AFTER COMPLETION OF EXECUTION OF O0003

| PROGRAM UNDER EXECUTION | O0001 | O0002 |
|---|---|---|
| WAIT M-CODE | | |
| | M902 NOT ISSUED | M902 NOT ISSUED |

FIG.5E WAIT MANAGEMENT TABLE AFTER O0001 AND O0002 ISSUE M902

| PROGRAM UNDER EXECUTION | O0001 | O0002 |
|---|---|---|
| WAIT M-CODE | | |
| | UNDER WAIT BASED ON M902 | UNDER WAIT BASED ON M902 |

FIG.5F WAIT MANAGEMENT TABLE AFTER COMPLETION OF EXECUTION OF O0001 AND O0002

| PROGRAM UNDER EXECUTION | | |
|---|---|---|
| WAIT M-CODE | | |
| | | |

FIG.6

| O0001<br>N100 G00 Z100;<br>N110 M901;<br>N120 Z200;<br>N140 Z300; | O0002<br>N100 G00 Y100;<br>N110 M901;<br>N120 Y200;<br>N140 Y300; | O0003<br>N100 G00 U100;<br>N110 M901;<br>N120 Z200; |

FIG.7

| O0001<br>N100 G00 Z100;<br>N110 M901;<br>N120 Z200;<br>N140 Z300; | O0002<br>N100 G00 Y100;<br>N110 M901;<br>N120 Y200;<br>N140 Y300; | O0003<br>N100 G00 U100;<br>N110 M901;<br>N120 Z200; | O0004<br>N100 G00 X100;<br>N110 M901;<br>N120 X200; |

FIG.8

NUMERICAL CONTROLLER

RELATED APPLICATION DATA

This application claims priority under 35 U.S.C. § 119 and/or § 365 to Japanese Application No. 2015-031314 filed Feb. 20, 2015, the entire contents is incorporated herein by reference.

BACKGROUND OF THE INVENTION

1. Field of the Invention

The present invention relates to a numerical controller. In particular, the present invention relates to a numerical controller capable of easily changing a wait target when waiting a plurality of control paths to perform machining in a waited manner.

2. Description of the Related Art

Wait between paths of a computerized numerical controller (CNC) involves designating a wait counterpart (path) when creating a machining program. For example, a case in which a program code "Pp" is used as a code that designates a wait counterpart and a pattern of a counterpart path to be waited is designated by the number of p will be considered. In this case, when a machining program is executed and a wait M-code is issued, the code Pp is decoded to calculate a wait target. Moreover, when all wait counterparts issue a common wait M-code, completion of wait is sent (for example, see Japanese Patent Application Publication No. H08-161022). In this case, when it is desired to change a wait target, all machining programs that include the common wait M-code are to be corrected.

The method proposed in Japanese Patent Application Publication No. H08-161022 has such a form that a control path to be waited is designated in advance by the code Pp. Thus, if the wait target is changed later, all codes Pp which are the instructions that designate a wait counterpart, in machining programs that include M-codes which are the same wait instructions need to be corrected. Moreover, if the number of paths increases, it is difficult to create a machining program.

SUMMARY OF THE INVENTION

Therefore, an object of the present invention is to provide a numerical controller capable of waiting control paths without issuing a wait instruction that designates a control path of a wait counterpart in advance.

A numerical controller according to the present invention is a numerical controller that performs multi-path control of controlling a plurality of paths and an axis belonging to each path based on a plurality of machining programs, the numerical controller including: a machining program storage unit that stores a plurality of machining programs capable of controlling the plurality of paths and describing a wait instruction code including a wait code number; a wait management table that stores, for each machining program, wait management information that correlates a machining program number for identifying the machining program, a wait code number of a wait instruction code included in the machining program, and a wait state of each wait code number of the wait instruction code included in the machining program; a decoder that decodes the machining program; an axis controller that executes a plurality of machining programs decoded by the decoder in parallel and controls at least one axis belonging to each of the plurality of paths; a wait controller that performs wait control of each of the axes by issuing an instruction to the axis controller based on the wait management information stored in the wait management table; and a management unit that updates the wait management information of each machining program stored in the wait management table according to the execution state of the plurality of machining programs.

The wait management table may store the wait management information of a machining program that has started to be executed among the plurality of machining programs.

According to the present invention, it is possible to change a path to be waited without changing a machining program. Moreover, it becomes easy to create a machining program.

BRIEF DESCRIPTION OF THE DRAWINGS

The above-mentioned and other objects and features of the present invention will become apparent from the following description of embodiments with reference to the accompanying drawings in which.

DESCRIPTION OF THE PREFERRED EMBODIMENTS

Hereinafter, an embodiment of the present invention will be described with reference to the drawings.

In the present invention, a numerical controller includes a wait management table, extracts a wait instruction described in a machining program of each control path in operation, and stores the extracted wait instruction in the wait management table. The numerical controller detects a control path of a wait target based on a common wait instruction described in the machining programs of the respective control paths, stored in the wait management table.

Figure 1:
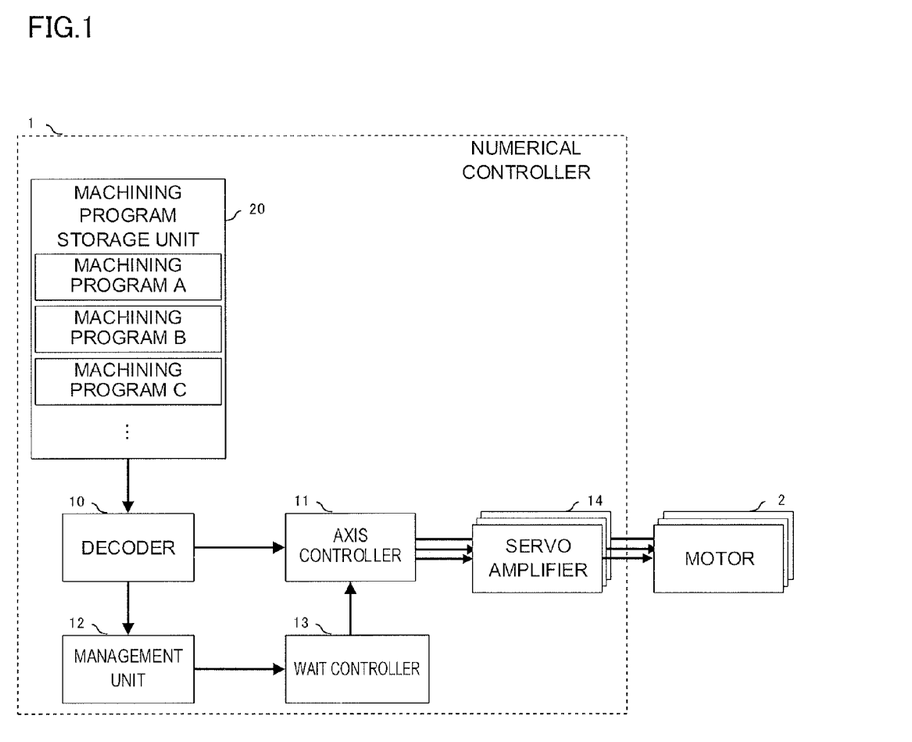
FIG. 1 is a functional block diagram of a numerical controller according to an embodiment of the present invention.

FIG. 1 is a functional block diagram of a numerical controller according to an embodiment of the present invention. A numerical controller 1 of the present invention includes a decoder 10, an axis controller 11, a management unit 12, a wait controller 13, a servo amplifier 14, and a machining program storage unit 20.

The decoder 10 reads and decodes a machining program of each path, stored in the machining program storage unit 20.

The axis controller 11 executes the machining programs of respective paths, decoded by the decoder 10 in parallel. Moreover, the axis controller 11 outputs an instruction to each servo amplifier 14 that controls a motor 2 of each path. Further, during execution of the machining program of each path, the axis controller 11 waits the machining programs of the respective paths and resets the wait according to the wait control of the wait controller 13 described later.

The management unit 12 manages a wait management table secured as an area on a memory (not shown). Moreover, the management unit 12 executes a wait management table management process such as registration, deletion, or change of a wait state of the machining program of each path, decoded by the decoder 10 with respect to the wait management table.

Figure 2:
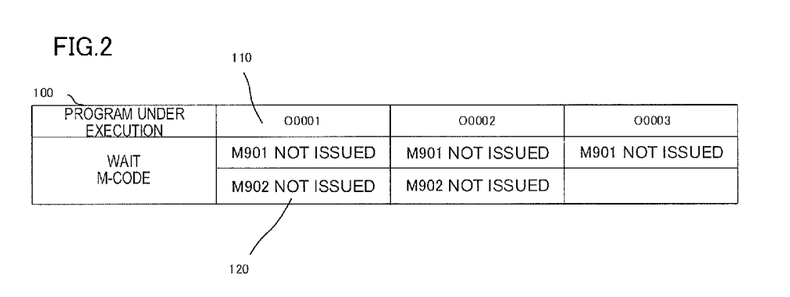
FIG. 2 is an example of a wait management table according to an embodiment of the present invention.

FIG. 2 illustrates an example of the wait management table. The wait management table 100 includes a program-under-execution management area 110 in which a machining program under execution is registered, the respective programs under execution registered in the program-under-execution management area 110, and a state information area 120. The state information area 120 stores the state of a program under execution related to a wait M-code for each number of the wait M-code included in the program under execution.

The wait controller 13 refers to the wait management table managed by the management unit 12 and performs a wait control process with respect to the axis controller 11 based on the wait state of the machining program of each path, registered in the wait management table. The wait controller 13 executes a wait control process between machining programs that issue the numbers of the same M-codes, registered in the wait management table.

Next, a wait control operation executed on the numerical controller 1 having the functional configuration illustrated in FIG. 1 will be described.

Example 1

Figure 3:
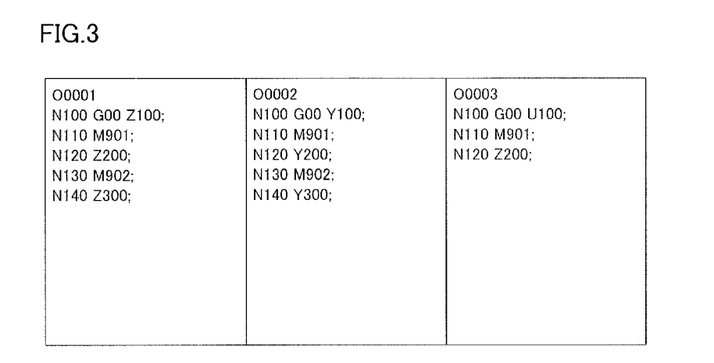
FIG. 3 is a diagram illustrating a machining program used in Example 1 of the present invention.

In this example, as illustrated in FIG. 3, an example in which a machining program for controlling three paths is used in an instruction block of wait M-codes will be described.

Figure 4A:
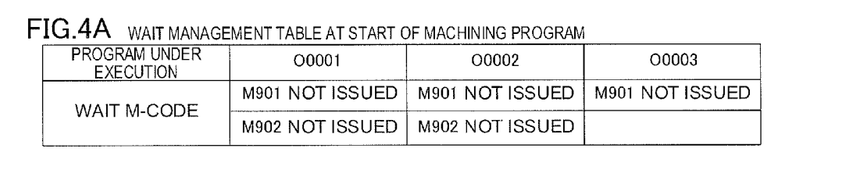
FIG. 4A is a diagram illustrating the flow of updating a wait management table according to Example 1 of the present invention and illustrates the wait management table at the start of a machining program.

In FIG. 3, a machining program O0001 for path 1, a machining program O0002 for path 2, and a machining program O0003 for path 3 are illustrated. When execution of the three machining programs starts, the decoder 10 decodes the machining program of each path. The management unit 12 creates a wait management table which is a wait memory according to the decoding result obtained by the decoder 10. In an initial state at the start of execution of the machining program, as illustrated in FIG. 4A, the number of a machining program under execution, a wait M-code in the machining program under execution, and state information of the wait M-code of the machining program under execution are stored in the wait management table.

When the wait management table is created so that execution of O0001 starts in path 1, O0002 starts in path 2, and O0003 starts in paths 3, respectively, O0001, O0002, and O0003 are added in the wait management table as machining program numbers of the machining programs which have started to be executed. Subsequently, the executed machining program is searched for a wait M-code, and when the wait M-code is present, the number of the wait M-code is added in the wait management table. Moreover, a non-instructed state is set as an original wait state of the added M-code.

In this example, when execution of the wait target of each path starts, the wait target becomes machining programs including the same wait M-code among the machining programs stored in the wait management table. Machining programs do not become the wait targets unless the machining programs include the same wait M-code. Moreover, although the machining programs include the same wait M-code, the machining programs do not become the wait targets unless the machining programs are not execution targets. Thus, unlike the conventional technique, it is not necessary to edit (change the code Pp that designates the pattern of a wait path) of a machining program even when a machining program of a partial path only is executed.

Figure 4B:
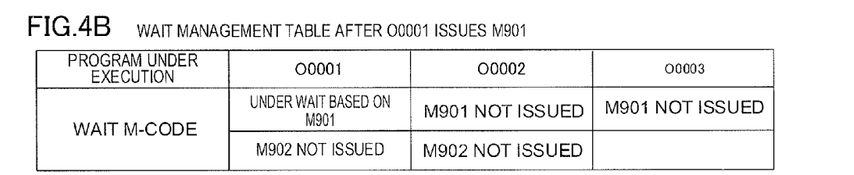
FIG. 4B is a diagram illustrating the flow of updating the wait management table according to Example 1 of the present invention and illustrates the wait management table after M901 is issued in O0001.
Figure 4C:
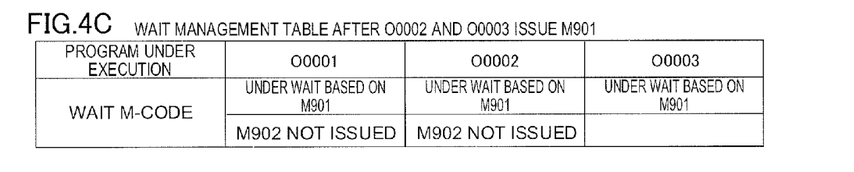
FIG. 4C is a diagram illustrating the flow of updating the wait management table according to Example 1 of the present invention and illustrates the wait management table after M901 is issued in O0002 and O0003.

After that, when execution of the machining program of each path progresses and the machining program O0001 issues M901, the management unit 12 updates the wait management table with a management table illustrated in FIG. 4B. In this step, the wait controller 13 issues an instruction to the axis controller 11 to wait path 1. Moreover, when the machining program O0002 issues M901, the wait management table is updated and wait control of path 2 is executed similarly. In this state, when the machining program O0003 issues M901, the management unit 12 updates the wait management table with a management table illustrated in FIG. 4C.

The management unit 12 determines that wait based on M-codes has been completed at the time when all machining programs of the respective paths stored in the wait management table have issued the same wait M-code. In this example, the management unit 12 determines that wait is completed upon checking that all machining programs under execution including M901 are waited based on M901 and deletes M901 from the wait management table. Moreover, the wait controller 13 sends a notification of completion of wait to the axis controller 11.

Figure 4D:
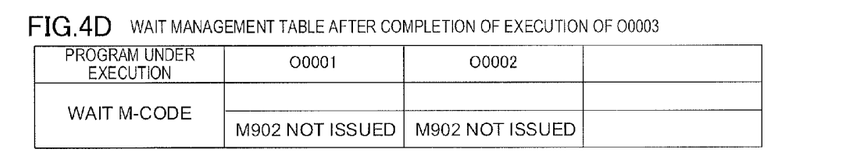
FIG. 4D is a diagram illustrating the flow of updating the wait management table according to Example 1 of the present invention and illustrates the wait management table after completion of execution of O0003.

After that, when the machining program O0003 ends, the management unit 12 deletes O0003 from the machining program under execution of the wait management table (FIG. 4D).

Figure 4E:
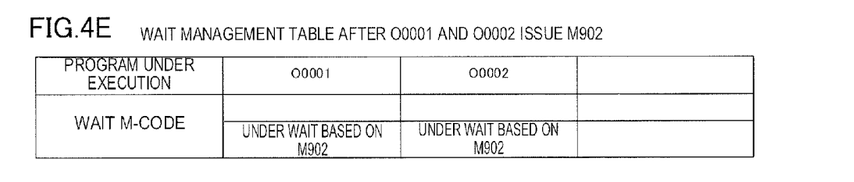
FIG. 4E is a diagram illustrating the flow of updating the wait management table according to Example 1 of the present invention and illustrates the wait management table after M902 is issued in O0001 and O0002.

Subsequently, when O0001 issues M902 (description of a wait control method will not be shown) and O0002 issues M902, the management unit 12 updates the wait management table with such a management table as illustrated in FIG. 4E.

The management unit 12 determines that wait is completed upon checking that all machining programs under execution including M902 are waited based on M902 and deletes M902 from the wait management table. Moreover, the wait controller 13 sends a notification of completion of wait to the axis controller 11.

Figure 4F:
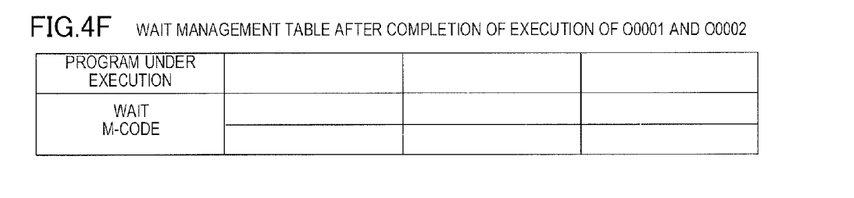
FIG. 4F is a diagram illustrating the flow of updating the wait management table according to Example 1 of the present invention and illustrates the wait management table after completion of execution of O0001 and O0002.

Finally, when execution of the programs O0001 and O0002 in the wait management table ends, the management unit 12 deletes O0001 and O0002 from the machining program under execution (FIG. 4F).

As described above, the numerical controller of this example updates the content of the wait management table according to an execution state of the machining program of each path. Moreover, wait control is performed based on the state of the wait management table. Thus, wait control can be performed independently of a wait path pattern as compared to the conventional technique.

Example 2

Figure 5A:
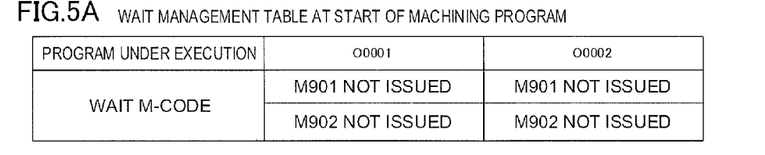
FIG. 5A is a diagram illustrating the flow of updating a wait management table according to Example 2 of the present invention and illustrates the wait management table at the start of a machining program.

This example is different from Example 1 in that O0001 is executed in path 1, O0002 is executed in path 2, and nothing is performed in path 3. In this case, at the start of a machining program of each path, the management unit 12 adds O0001 and O0002 to the wait management table as the machining program numbers of the machining programs which have started to be executed but does not add O0003. After the machining program numbers are added, the executed machining program is searched for a wait M-code. When the wait M-code is present, the management unit 12 adds the number of the wait M-code to the wait management table and sets a non-instructed state as a wait state (FIG. 5A).

Figure 5B:
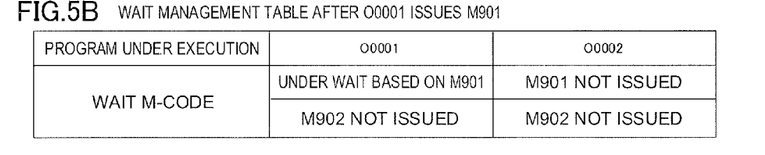
FIG. 5B is a diagram illustrating the flow of updating the wait management table according to Example 2 of the present invention and illustrates the wait management table after M901 is issued in O0001.

After that, when execution of the machining program of each path progresses and the machining program O0001 issues M901, the management unit 12 updates the wait management table with a management table illustrated in FIG. 5B. In this step, the wait controller 13 issues an instruction to the axis controller 11 to wait path 1.

Figure 5C:
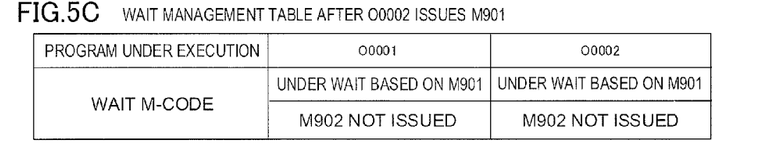
FIG. 5C is a diagram illustrating the flow of updating the wait management table according to Example 2 of the present invention and illustrates the wait management table after M901 is issued in O0002.

Moreover, when the machining program O0002 issues M901, the management unit 12 updates the wait management table with a management table illustrated in FIG. 5C.

Figure 5D:
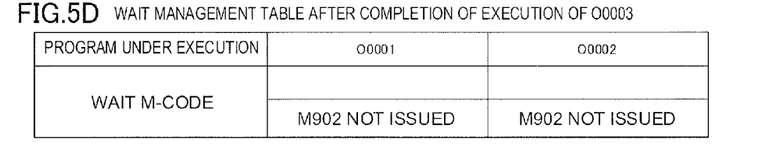
FIG. 5D is a diagram illustrating the flow of updating the wait management table according to Example 2 of the present invention and illustrates the wait management table after completion of execution of O0003.
Figure 5E:
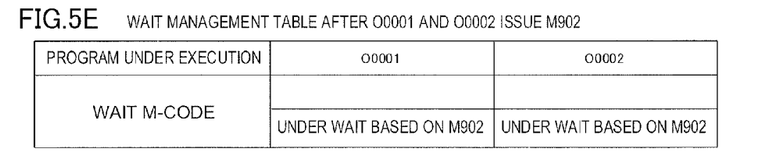
FIG. 5E is a diagram illustrating the flow of updating the wait management table according to Example 2 of the present invention and illustrates the wait management table after M902 is issued in O0001 and O0002.

The management unit 12 determines that wait is completed upon checking that all machining programs under execution including M901 are waited based on M901 and deletes M901 from the wait management table (FIG. 5D). Moreover, the wait controller 13 sends a notification of completion of wait to the axis controller 11. Although the machining program O0003 of path 3 includes the same wait M-code M901, since a machining program which has not started to be executed is not registered in the wait management table, O0003 does not become a wait target.

Subsequently, when O0001 issues M902 (description of a wait control method will not be shown) and O0002 issues M902, the management unit 12 updates the wait management table with a management table illustrated in FIGS. 5A to 5F.

The management unit 12 determines that wait is completed upon checking that all machining programs under execution including M902 are waited based on M902 and deletes M902 from the wait management table. Moreover, the wait controller 13 sends a notification of completion of wait to the axis controller 11.

Figure 5F:
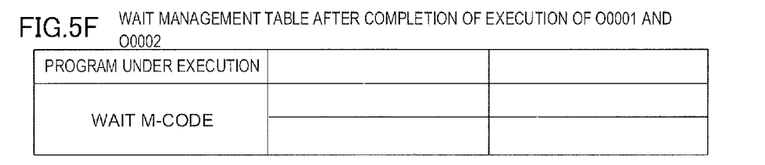
FIG. 5F is a diagram illustrating the flow of updating the wait management table according to Example 2 of the present invention and illustrates the wait management table after completion of execution of O0001 and O0002.

Finally, when execution of the programs O0001 and O0002 in the wait management table ends, the management unit 12 deletes O0001 and O0002 from the machining program under execution (FIG. 5F).

As described above, the numerical controller of the present invention performs wait control based on the state of the wait management table. Thus, even when a machining program of a partial path in which a wait code is included is not executed, it is possible to perform wait control of a machining program of each path without editing a wait path pattern or the like.

Example 3

Figure 6:
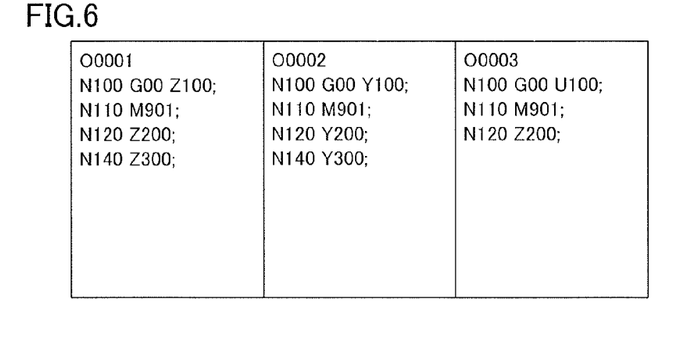
FIG. 6 is a diagram illustrating a machining program used in Example 3 of the present invention.

In this example, an example in which a machining program of each path illustrated in FIG. 6 is edited will be described. In the machining program illustrated in FIG. 6, when O0001 is executed in path 1, O0002 is executed in path 2, and O0003 is executed in path 3, O0001, O0002, and O0003 perform wait based on M901. Here, when it becomes unnecessary to perform wait in O0003 of path 3 due to a change in the machining content, the numerical controller of the present invention deletes a block "N110 M901;" of O0003. When O0001 and O0002 are executed without any edit, the wait M-code M901 is not registered in the state information area of O0003 in the wait management table. Thus, wait is performed in O0001 and O0002 only, and wait is not performed in O0003.

As described above, the numerical controller of this example performs wait control based on the state of the wait management table. Thus, even when the wait M-code of a machining program of a partial path is deleted, it is possible to perform wait control of the machining program of each path without editing the machining program of another path or the like.

Example 4

Figure 7:
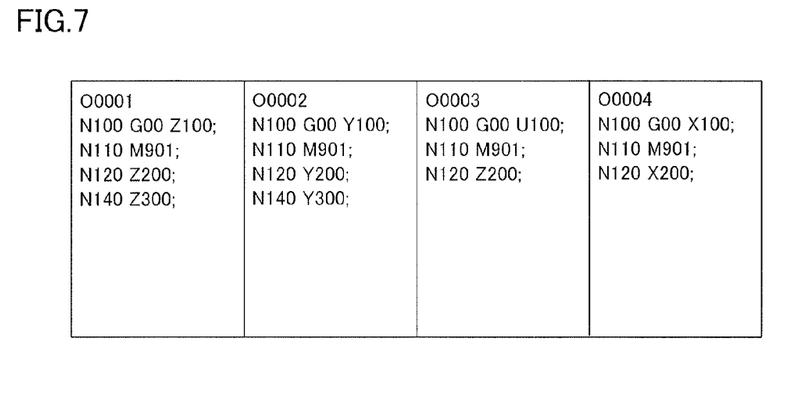
FIG. 7 is a diagram illustrating a machining program used in Example 4 of the present invention.

In this example, an example in which a machining program of another path is added to a machining program of each path illustrated in FIG. 6 and is executed will be described. In the machining programs O0001, O0002, and O0003 illustrated in FIG. 6, when O0001 is executed in path 1, O0002 is executed in path 2, and O0003 is executed in path 3, wait is performed based on M901. A case in which as illustrated in FIG. 7, a machining program O0004 executed by path 4 is added to the above-described machining programs and wait is performed will be considered.

In this case, "M901" is added to O0004, and O0001, O0002, and O0003 are not edited. When O0001 is executed in path 1, O0002 is executed in path 2, O0003 is executed in path 3, and O0004 is executed in path 4, wait is performed by O0001, O0002, O0003, and O0004.

As described above, the numerical controller of this example performs wait control based on the state of the wait management table. Thus, by additionally executing a machining program in which a wait M-code is described, it is possible to perform wait control of the machining program of each path without editing the machining program of another path or the like.

Example 5

In this example, an example in which an editing error or the like in a machining program is detected will be described.

At the start of execution of a machining program, the machining program is searched for a wait M-code. In this case, when the wait M-code present in the wait management table is not present in the machining program which is to start to be executed, a warning message is displayed on an operation panel or the like in order to check whether the wait M-code is necessary. By doing so, it is possible to obtain a confirmation from an operator.

When such a warning message is displayed, the operator checks a machining program. When the wait M-code is not included due to a program error, it is possible to stop execution of the machining program and to correct the machining program. When the wait M-code is not included since the wait M-code is not necessary rather than due to a program error, the machining program may be executed as it is.

Examples of a case in which the wait M-code is already registered in the wait management table include a case in which machining programs of respective paths are sequentially read (the M-codes included in a machining program read previously is registered in the wait management table). Other examples include a case in which machining is temporarily stopped and some machining programs are edited and read again and a case in which a machining program is added.

As described above, the numerical controller of this example can check the machining program of each path using information registered in the wait management table. Thus, it is possible to prevent malfunctioning due to program editing errors by an operator.

Figure 8:
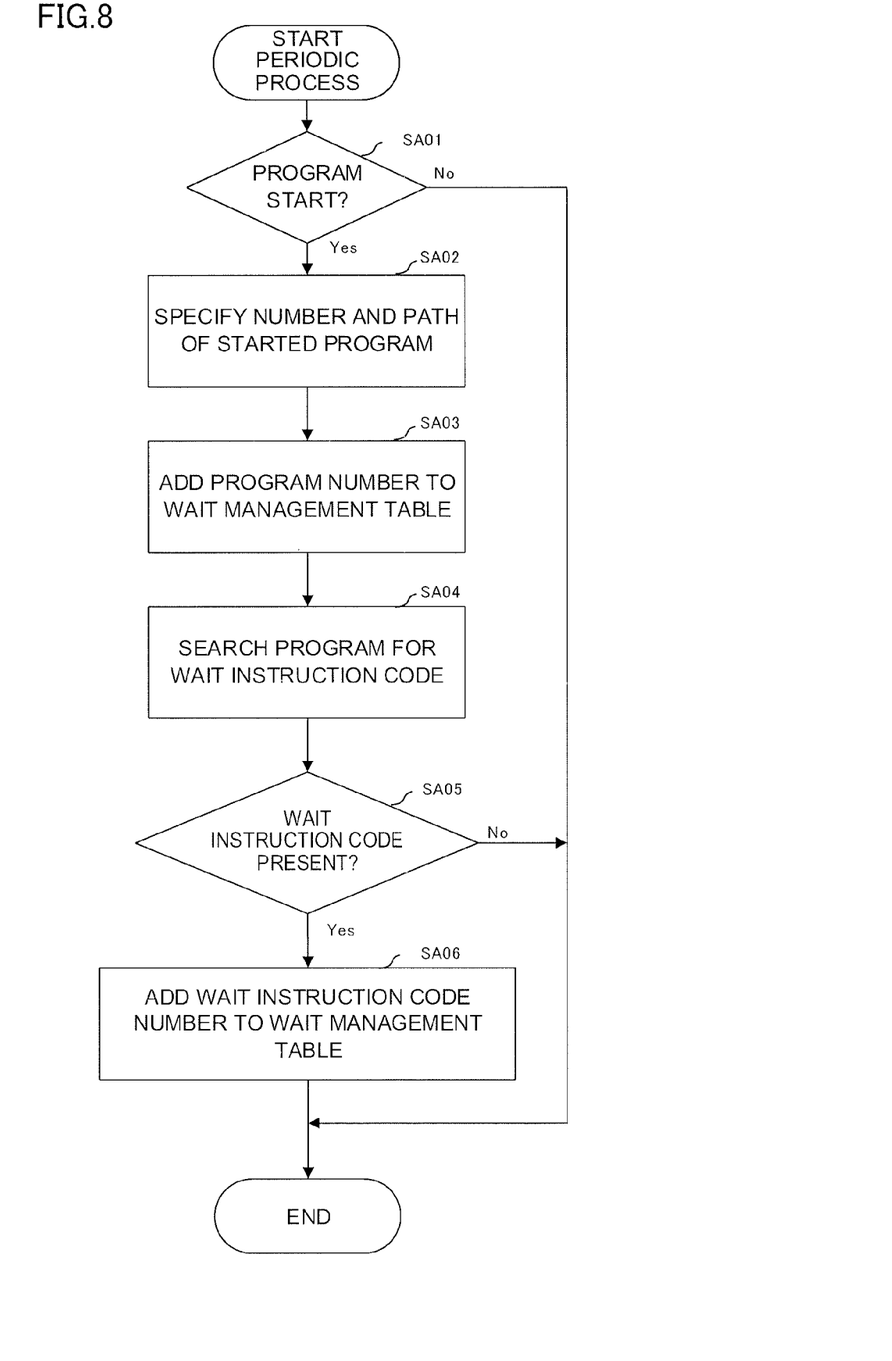
FIG. 8 is a flowchart of the process at the start of machining program executed on a numerical controller according to an embodiment of the present invention.

FIG. 8 is a flowchart of the process at the start of a machining program executed on the numerical controller of an embodiment of the present invention. This process is executed every control cycle of the numerical controller.

Step SA01

It is determined whether an instruction to start a machining program has been issued. When an instruction to start the machining program has been issued (YES), the flow proceeds to step SA02. When the instruction is not issued (NO), this process ends at the present cycle.

Step SA02

The decoder 10 decodes a machining program of each path, instructed to be started and specifies a program number of each machining program and a path to be executed.

Step SA03

The management unit 12 adds a program number of each program specified in step SA02 to the wait management table.

Step SA04

The decoder 10 retrieves a wait instruction code in each machining program.

Step SA05

It is determined whether the wait instruction code has been retrieved from each machining program in step SA04.

When the wait instruction code is retrieved (YES), the flow proceeds to step SA06. When the wait instruction code is not retrieved (NO), this process ends at the present cycle.

Step SA06

The management unit 12 registers the wait instruction code retrieved in step SA04 in the wait management table in correlation with each program.

Figure 9:
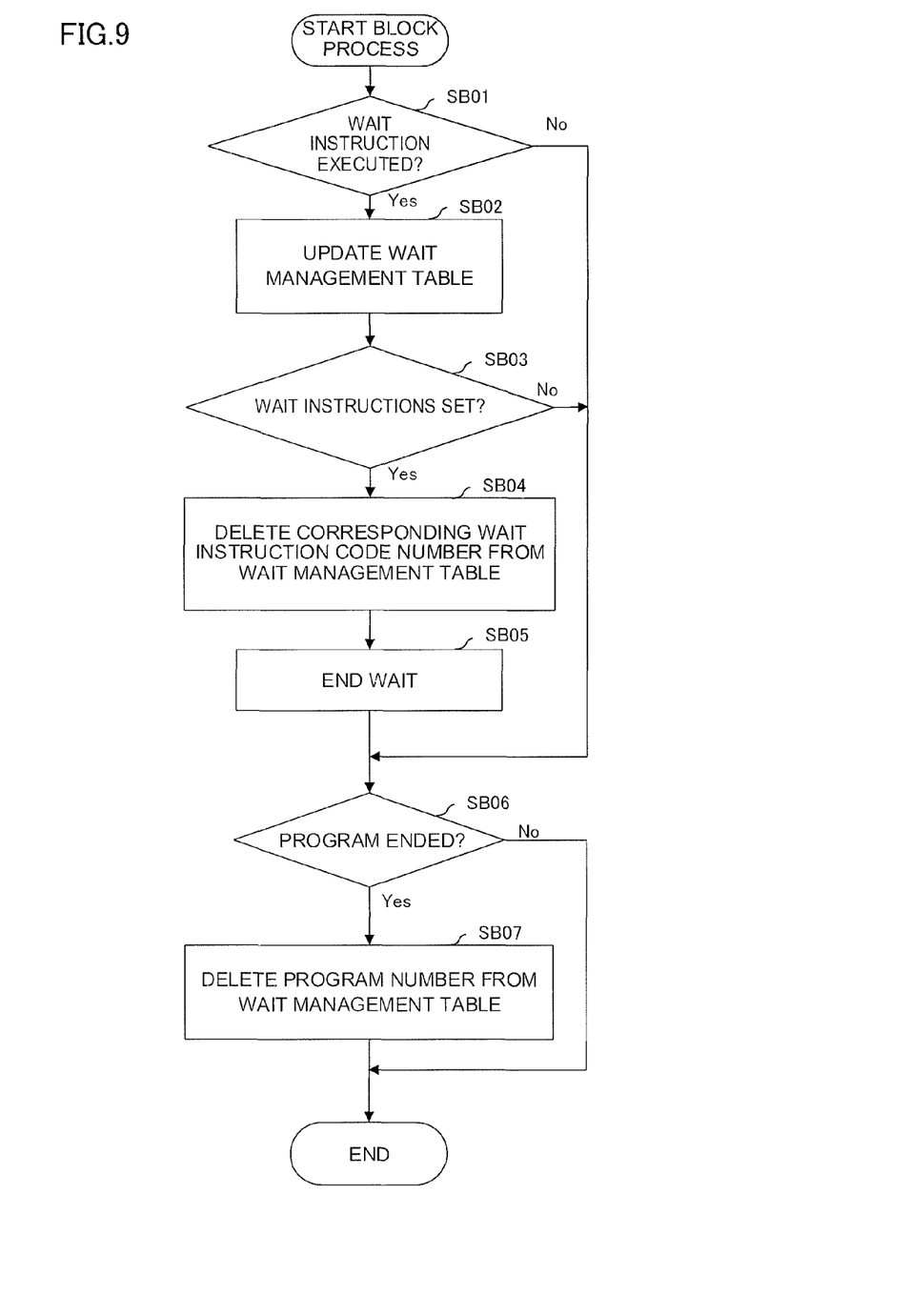
FIG. 9 is a flowchart of a wait management table updating process and a wait control process executed on a numerical controller according to an embodiment of the present invention.

FIG. 9 is a flowchart of the process during execution of a machining program executed on the numerical controller according to an embodiment of the present invention. This process is executed in a block process at the control cycle of the numerical controller.

Step SB01

The management unit 12 determines whether a wait instruction has been executed in a machining program of each path. When the wait instruction has been executed (YES), the flow proceeds to step SB02. When the wait instruction has not been executed (NO), the flow proceeds to step SB06.

Step SB02

The management unit 12 updates the state registered in the wait management table, of the wait instruction code number of the wait instruction of the machining program determined in step SB01 as having been executed to "under wait".

Step SB03

The wait controller 13 determines whether all states of the wait instruction code numbers registered in the wait management table are rearranged to "under wait". When all states are rearranged (YES), the flow proceeds to step SB04. When all states are not rearranged (NO), the flow proceeds to step SB06.

Step SB04

The management unit 12 deletes the wait instruction code numbers, the states of which are determined in step SB03 as being rearranged from the wait management table.

Step SB05

The wait controller 13 sends a notification of completion of wait to the axis controller 11 with respect to the path that is waited based on the wait instruction code numbers, the states of which are determined in step SB03 as being rearranged.

Step SB06

It is determined whether execution of the machining program of each path has ended. When the ended machining program is present (YES), the flow proceeds to step SB07. When the ended machining program is not present (NO), this process ends at the present cycle.

Step SB07

The management unit 12 deletes the machining program, the execution of which is determined in step SB06 as having ended, from the wait management table and ends this process at the present cycle.

While an embodiment of the present invention has been described, the present invention is not limited to the example of the above-described embodiment but may be changed appropriately and be implemented in various forms.

What is claimed is:

1. A numerical controller that performs multi-path control of controlling a plurality of paths and an axis belonging to each path based on a plurality of machining programs, the numerical controller comprising:
   a machining program storage unit that stores a plurality of machining programs capable of controlling the plurality of paths and describing a wait instruction code including a wait code number;

a wait management table that stores, for each machining program, wait management information that correlates a machining program number for identifying the machining program, a wait code number of a wait instruction code included in the machining program, and a wait state of each wait code number of the wait instruction code included in the machining program;

a decoder that decodes the machining program;

an axis controller that executes a plurality of machining programs decoded by the decoder in parallel and controls at least one axis belonging to each of the plurality of paths;

a wait controller that performs wait control of each of the axes by issuing an instruction to the axis controller based on the wait management information stored in the wait management table; and a management unit that updates the wait management information of each machining program stored in the wait management table according to the execution state of the plurality of machining programs.

2. The numerical controller according to claim 1, wherein the wait management table stores the wait management information of a machining program that has started to be executed among the plurality of machining programs.

* * * * *